(12) United States Patent
Klinke et al.

(10) Patent No.: US 12,126,971 B2
(45) Date of Patent: Oct. 22, 2024

(54) ACOUSTIC SIGNAL PROCESSING ADAPTIVE TO USER-TO-MICROPHONE DISTANCES

(71) Applicant: Intel Corporation, Santa Clara, CA (US)

(72) Inventors: Piotr Klinke, Szczecin (PL); Damian Koszewski, Gdansk (PL); Przemyslaw Maziewski, Gdansk (PL); Jan Banas, Gdansk (PL); Kuba Łopatka, Gdansk (PL); Adam Kupryjanow, Gdansk (PL); Paweł Trella, Gdansk (PL); Paweł Pach, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 17/132,647

(22) Filed: Dec. 23, 2020

(65) Prior Publication Data
US 2021/0120353 A1 Apr. 22, 2021

(51) Int. Cl.
| | | |
|---|---|---|
| H04R 29/00 | (2006.01) | |
| G01S 11/14 | (2006.01) | |
| G06N 3/08 | (2023.01) | |
| G10L 21/0232 | (2013.01) | |
| G10L 25/30 | (2013.01) | |

(Continued)

(52) U.S. Cl.
CPC ............ H04R 29/004 (2013.01); G01S 11/14 (2013.01); G06N 3/08 (2013.01); G10L 21/0232 (2013.01); G10L 25/30 (2013.01); G10L 25/51 (2013.01); H04R 1/08 (2013.01); G10L 2021/02082 (2013.01)

(58) Field of Classification Search
CPC . H04R 1/08; H04R 3/00; H04R 3/005; H04R 3/12; H04R 29/00; H04R 29/001; H04R 29/002; H04R 29/004; H04R 29/005; G01S 11/14; G06N 3/08; G10L 21/0232; G10L 25/30; G10L 25/51; G10L 2021/02082
USPC ........................................................... 381/66
See application file for complete search history.

(56) References Cited

U.S. PATENT DOCUMENTS 9,197,974 B1 * 11/2015 Clark .................... H04R 29/004
10,349,172 B1 * 7/2019 Huang ..................... H04R 3/04
(Continued)

FOREIGN PATENT DOCUMENTS

KR 10-2012-0022101 3/2012

OTHER PUBLICATIONS

Patent Cooperation Treaty, "International Preliminary Report on Patentability," issued in connection with PCT patent application No. PCT/US2021/050055, date of issuance Jun. 13, 2023, 6 pages.
(Continued)

*Primary Examiner* — Paul Kim
(74) *Attorney, Agent, or Firm* — HANLEY, FLIGHT & ZIMMERMAN, LLC

(57) ABSTRACT

Apparatus, systems, methods, and articles of manufacture are disclosed for acoustic signal processing adaptive to microphone distances. An example system includes a microphone to convert an acoustic signal to an electrical signal and one or more processors to: estimate a distance between a source of the acoustic signal and the microphone; select a signal processing mode based on the distance; and process the electrical signal in accordance with the selected processing mode.

16 Claims, 7 Drawing Sheets

(51) Int. Cl.
*G10L 25/51* (2013.01)
*H04R 1/08* (2006.01)
*G10L 21/0208* (2013.01)

(56) References Cited

U.S. PATENT DOCUMENTS

| | | | |
|---|---|---|---|
| 2004/0141418 A1* | 7/2004 | Matsuo | H04R 3/005 367/124 |
| 2010/0278365 A1* | 11/2010 | Biundo Lotito | H04R 25/405 381/315 |
| 2012/0327746 A1 | 12/2012 | Velusamy | |
| 2015/0058003 A1* | 2/2015 | Mohideen | G10L 15/20 704/233 |
| 2015/0326968 A1* | 11/2015 | Shigenaga | G09G 5/391 381/92 |
| 2016/0021458 A1 | 1/2016 | Johnson et al. | |
| 2016/0064012 A1* | 3/2016 | Endo | H04M 1/605 704/205 |
| 2017/0278519 A1* | 9/2017 | Visser | H04R 3/005 |
| 2018/0190308 A1 | 7/2018 | Lou et al. | |
| 2020/0243067 A1 | 7/2020 | Maziewski et al. | |
| 2021/0320636 A1* | 10/2021 | Matsukawa | H03G 3/02 |

OTHER PUBLICATIONS

Introducing the Intel® Evo™ Platform, retrieved from https://www.intel.com/content/www/us/en/products/docs/evo.html, on Dec. 1, 2020 3 pages.

Holt, "MSI unveils its first Intel Evo-certified laptop," reteived from https://www.engadget.com/msi-11th-gen-intel-cpus-evo-certified-153019373.html, on Dec. 1, 2020, 3 pages.

Łopatka et al., "State sequence pooling training of acoustic models for keyword spotting," 5 pages.

Eaton et al., "Estimation of room acoustic parameters: The ACE Challenge," 12 pages.

International Searching Authority, "Search Report and Written Opinion," issued in connection with PCT patent application No. PCT/US2021/050055, mailed on Dec. 29, 2021, 11 pages.

* cited by examiner

ACOUSTIC SIGNAL PROCESSING ADAPTIVE TO USER-TO-MICROPHONE DISTANCES

FIELD OF THE DISCLOSURE

This disclosure relates generally to acoustic signals, and, more particularly, to acoustic signal processing adaptive to user-to-microphone distances.

BACKGROUND

Sound produced in a room repeatedly reflects off surfaces and objects such as the floor, walls, ceiling, windows etc. while gradually losing energy. Sound waves reflect differently from different surfaces. Reverberation is created when the reflecting sound waves mix with each other. When a person is speaking far from a microphone, the speech signal gathered by the microphone is weak, noisy, and burdened with high reverberation. When the person speaking is close the microphone, the speech signal is stronger and clearer.

Figure 1:
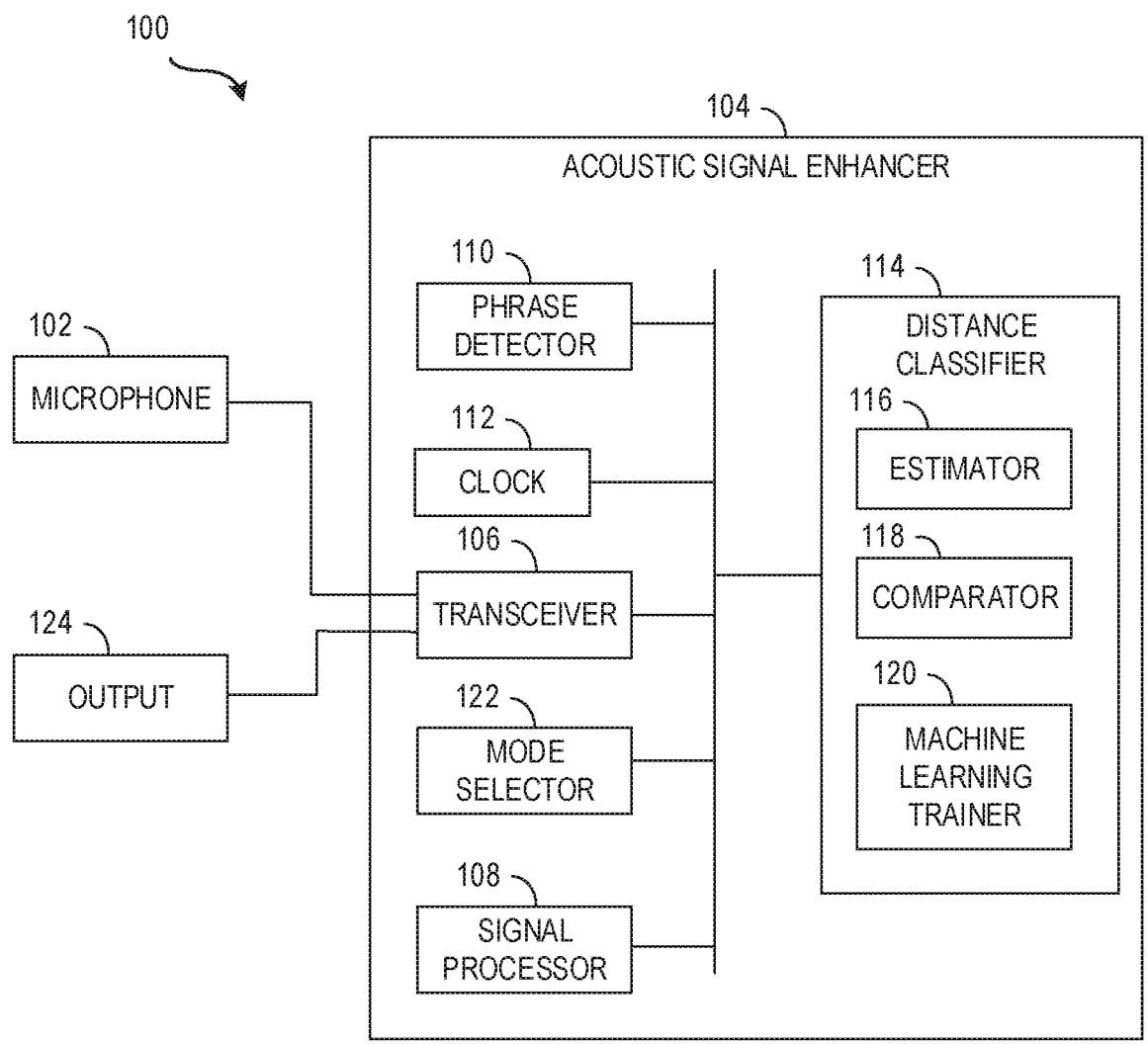
FIG. 1 is block diagram of an example system for acoustic signal processing adaptive to user-to-microphone distances in accordance with the teachings of this disclosure.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

As sounds waves reflect off surfaces and objects in a room, the waves slowly diminish or fade away as the waves lose energy. Reverberation time is the amount of time between when a source of a sound has stopped producing the sound and when the sound fades away or no longer reverberates. Reverberation time is dependent on features of a room including, for example, contents of the room. Some contents such as, for example, curtains, fabric furniture, people, and other absorbent surfaces, objects, etc., absorb sound energy and reduce reverberation time.

A Reverberation time (RT) metric is a measurement of a time between when a source of the sound stops producing the sound and when a sound pressure level is decreased by 60 decibels (dB). The abbreviation for Reverberation Time is RT60.

Reverberation can obscure the intelligibility of speech. Obscured speech is difficult for both humans and machines to understand. Thus, high amounts of reverberation negatively impact voice-controlled machines, voice over IP (VoIP) calls, and other voice communications.

Audio capture devices include microphones, and the terms may be used interchangeably throughout this disclosure. Some example audio capture enabled devices are equipped with signal processing functionality including signal enhancement algorithms. Throughout this disclosure and claims, signal processing is to be understood to also encompass processing known as pre-processing. The signal enhancement algorithms are used to improve the quality of an acoustic signal gathered from or detected by a microphone. In some examples, the signal enhancement algorithms increase signal quality such as, for example, by background noise or reverberation reduction. Increased signal quality increases automatic speech recognition accuracy and perceived quality for machine applications, VoIP calls, etc.

The distance between a person and an audio capture device can affect the quality of the acoustic signal. For example, a microphone may gather speech signals that are weak, noisy, and burdened with high reverberation when the person speaking is far from the microphone (e.g., far field). In addition, the microphone may gather signals that are stronger and clearer when the person speaking is closer to the microphone (e.g., near field). In some examples, the signal enhancement algorithms are tuned to support the best-case usage scenarios (e.g., clear acoustic signals) and worst-case usage scenarios (e.g., heavily reverberating and/or noisy acoustic signals) at the same time. In other words, the signal enhancement algorithms process all signals using the same level of processing and, thus, consume the same computing resources regardless of the clarity or obfuscation of the acoustic signals being processed and regardless of the distance between the person and the device (e.g., microphone). In such examples, there is a compromise between computing power consumption for processing the acoustic signals and signal quality at different distances between the person and the microphone. For example, when a person is far away from the device and the speech signal is weak, noisy, and burdened with a high amount of reverberation, the signal processing consumes increased computing power to improve signal quality. On the other hand, when the person is closer to the device and the signal is clearer, such strong signal processing is not required because the signal is of high enough quality.

Traditional signal processing does not distinguish the distance between the person and the microphone. As a result, the same level of processing load and computing resources are implemented for all scenarios (all distances between the person and the microphone). Thus, when the person is close to the microphone (near field), traditional signal processing consumes too much computing power because full signal processing is implemented on a signal that can be clarified or cleared with less processing. In addition, the traditional signal processing degrades the quality of the speech signal.

Disclosed herein are examples that distinguish the distance between the user or person and the device (e.g., microphone). Based on the distance, the examples disclosed herein select or switch between or among signal processing and operating modes. These examples allow for a compromise-free signal processing such that signals from near field users are not over processed and do not consume too many processing resources. The solution of the examples disclosed herein save power when a user is located within certain proximity to the device or microphone while ensuring the best quality of the enhanced signal at all distances.

The examples disclosed herein have application in many fields. For example, enhancing signal quality for acoustic signals of speech improves the field of automatic speech recognition (ASR) including key phrase detection (KPD) or key word spotting (KWS). These examples also improve other fields such as, for example, VoIP communication. For example, in teleconferences, a speaker distance can be determined and VoIP processing can be adjusted. There also are applications in multimodal voice plus gesture control. For example, controlling the processing of the gesture recognition signal in multimodal devices (speech plus vision) and virtual reality and/or augmented reality gaming devices. These examples also improve user separation, which includes, for example, separating users based on speech distance and as an additional feature for speaker diarization. The examples with speaker diarization are applicable, for example, in automotive environments as the user to microphone distances are known for any given car model. These examples also improve proximity recognition (deciding which user command is to be executed first), etc.

FIG. 1 is block diagram of an example system 100 for acoustic signal processing adaptive to microphone distances in accordance with the teachings of this disclosure. The example system 100 of FIG. 1 is a system to process acoustic signals and electrical signals derived from and/or representative of acoustic signals. The example system 110 of FIG. 1 also is a system to reduce power consumption of a computing device.

The example system 100 includes an example microphone 102 and an example acoustic signal enhancer 104. The example acoustic signal enhancer 104 includes an example transceiver 106, an example signal processor 108, an example phrase detector 110, an example clock 112, and an example distance classifier 114. The example distance classifier 114 includes an example estimator 116, an example comparator 118, and an example machine learning trainer 120. The example acoustic signal enhancer 104 also includes an example mode selector 122. The example system 100 also includes an example output 124.

The microphone 102 is representative of acoustic capture devices. The microphone 102 detects, gathers, or receives acoustic signals. For example, the microphone 102 detects acoustics signals from a person or other sound source. The microphone 102 and the acoustic signal enhancer 104 are communicatively coupled via the transceiver 106. In some examples, a transducer is used instead of or in addition to a transceiver. The acoustic signal, a representation of the acoustic signal, data related to the acoustic signal (all collectively generally referred to as the acoustic signal) are transmitted between the microphone and the acoustic signal enhancer via the transceiver 106. For example, the microphone 102 detects an acoustic signal and converts the acoustic signal to an electrical signal. The electrical signal is representative of and/or derived from the acoustic signal. The microphone 102 transmits the electrical signal to the acoustic signal enhance 104.

With the acoustic signal and/or electrical signal received, accessed, or otherwise obtained by the acoustic signal enhancer 104, the signal processor 108 may initially process the signal to, for example, remove noise, filter the signal to a frequency or frequency band of interest, etc. The initial processing provides a signal with more clarity and fewer undesired elements, which results in a lower amount of signal data for further processing, as disclosed herein.

The phrase detector 110 determines that the acoustic signal includes speech. The phrase detector 110 identifies one or more key words or one or more key phrases as an indication that the acoustic signal includes speech. For example, the phrase detector 110 executes an algorithm that recognizes acoustic units constituting a keyword. For example, the key word "Hello computer" is decomposed into 24 triphones: "silence-H-EH, H-EH-L, EH-L-OW, . . . ". The triphones translate to states that are modelled by the example acoustic model, e.g. outputs 573 1045 2386 model the posterior probability of the triphone "H-EH-L", etc. This is one specific example, and there are many others. In some examples, the acoustic model is a neural network that outputs posterior probabilities of triphone states. The inputs to the network are filterbank features, i.e. the energy in mel-frequency bands. The posterior probabilities are aggregated in the phrase model through sequence decoding. The phrase model yields a high score if a correct sequence of triphone states is recognized by the network. The score builds up until the final state is reached and then the final scores spikes, which means that the phrase detector 110 detects a keyword or a key phrase. In some examples, to save processing resources, the acoustic signal enhancer 104 does not process the signal in accordance with the example signal processing that is adaptive to user-to-microphone distances disclosed herein.

The distance classifier 114 analyzes the signal to assess, determine, and/or classify the distance between the user, person, or source of the sound producing the acoustic signal and the microphone 102. In some examples, the distance classifier 114 determines the user-to-microphone distance directly from speech samples in the acoustic signal. For example, the distance classifier 114 uses a neural network (e.g., FIG. 2) with the acoustic signal as input. In some examples, the acoustic signal is analyzed frame-by-frame in the neural network. Further details of an example neural network are disclosed herein.

In some examples, the machine learning trainer 120 implements machine learning and artificial intelligence to train the distance classifier 114 in the classification of distances between the microphone 102 and the source of the acoustic signal. The machine learning trainer 120 implements a training phase for the distance classifier 114. In an example training phase, the estimator 116 analyzes the signal and determines or identifies a direct pulse. The estimator 116 also determines or identifies a time of the direct pulse based on time information provided by the clock 112. The estimator 116 also analyzes the acoustic system, which includes the acoustic signal, features of the environment in which the acoustic signal exists, features of the microphone, etc., to determine or identify an impulse response. The estimator 116 determines or calculates a direct-to-reverberant ratio (DRR). DRR is a metric that is measured in decibels. DRR is a ratio of a sound pressure level of a direct sound from a source at a location to the reverberant sound pressure level simultaneously incident to the same location. The estimator 116 may determine the DRR via Equation (1):

$$DRR = 10\ \log_{10}\left(\frac{X(T_0 - C:T_0 + C)^2}{X(T_0 + C + 1:\text{end})^2}\right) \quad \text{Equation (1)}$$

where X is the approximated integral of the impulse response, To is the time of the direct impulse, and C=2.5 millliseconds (ms).

Comparator 118 compares the DRR to a threshold. The distance classifier 114 classifies the distance between the microphone 102 and the source of the acoustic signal based on the comparison of the DRR to a threshold. If the DRR meets the threshold the distance between the microphone 102 and the source of the acoustic signal may be classified as near field. If DRR does not meet the threshold the between the microphone 102 and the source of the acoustic signal may be classified as far field. For example, the threshold may be zero dB. Thus, a DRR greater than zero dB indicates that the distance between the microphone 102 and the source of the acoustic signal is near field. A DRR less than zero dB indicates that the distance between the microphone 102 and the source of the acoustic signal is far field. In other examples, the threshold may be different than zero dB such as, for example, the threshold may be 2 dB or another suitable level.

The classification of the distance between the microphone 102 and the source of the acoustic signal as near field or far field is significant because an acoustic signal gathered when the distance between the microphone 102 and the source of the acoustic signal is far field is likely to have more reverberation than an acoustic signal gathered when the distance between the microphone 102 and the source of the acoustic signal is near field. Thus, an acoustic signal gathered when the distance between the microphone 102 and the source of the acoustic signal is far field will require more signal processing to remove the reverberation and clarify the signal. An acoustic signal gathered when the distance between the microphone 102 and the source of the acoustic signal is near field will likely include less reverberation than an acoustic signal gathered when the distance between the microphone 102 and the source of the acoustic signal is far field. Thus, an acoustic signal gathered when the distance between the microphone 102 and the source of the acoustic signal is near field will require less signal processing to provide a signal with greater clarity. In the example of a near field distance, the acoustic signal may need less dereverberation than a signal gathered from a far field distance or the signal gathered from the near field distance may need no dereverberation at all.

The categorization of near field and far field may be dependent on the application of the examples disclosed here, the electronic device processing the signal, the specifications of the microphone, a device manufacturer's specifications and/or preferences, etc. In some examples, 275 centimeters (cm) is far field and 90 cm is near field. In some examples, 400 cm is far field, and 80 cm is near field. In some examples, three meters (m) is far field and less than three meters is near field. In some examples, 50 cm or 70 cm are near field. In some examples, 1.5 m is a threshold between near field and far field. In some examples, the distinction between near field and far field is independent of the location of the microphone and/or location of the source of the acoustic signal.

Figure 2:
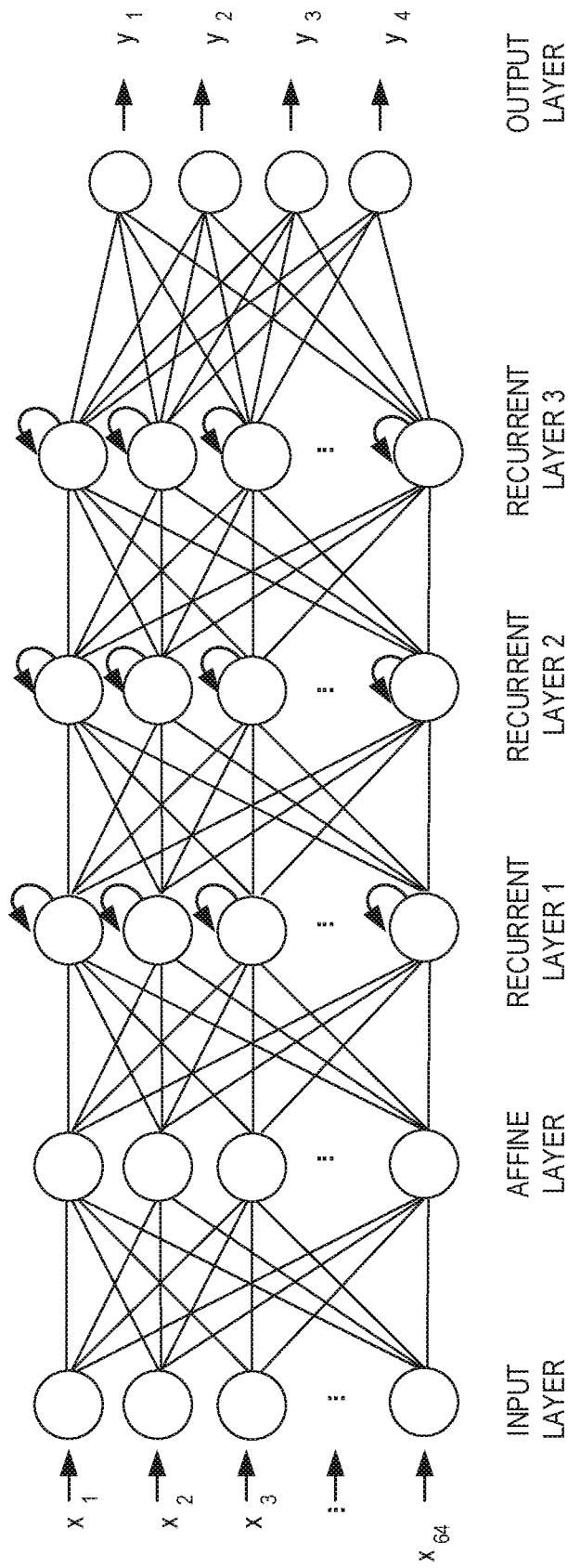
FIG. 2 is a schematic illustration of an example neural network.

In some examples, the machine learning trainer 120 implements a Deep Neural Network (DNN). An example neural architecture is shown in FIG. 2. The example architecture of FIG. 2 includes an input layer to accept input data including, for example, the signal, impulse responses, direct impulses, timing information, and distances from prior or known examples. The illustrated example architecture includes an affine layer, where all nodes or artificial neurons have been connected. The nodes receive an input, process the input in accordance with an algorithm or function, generate an output for further processing in the neural network. The illustrated example architecture includes one or more recurrent layers. In the recurrent layers, some of the nodes are looped, which allows previously developed or learned information to be used in further processing. The illustrated example architecture includes an output later, where, in examples disclosed herein, distance estimation and/or classification is produced and/or communicated. In other examples, the architecture may include additional or alternative layers including, for example, convolutional layers, residual layers, etc. Thus, other neural networks may be implemented.

The machine learning trainer 120 trains the estimator 116 using the DRR parameter in the training phase of the machine learning algorithm. In some examples, the machine learning trainer 120 enables a coarse or rough estimate of the distance between the microphone 102 and the source of the acoustic signal rather than requiring an exact distance or DRR estimation. To facilitate neural network training, DRR can be estimated by assigning the input signal to one of a predefined DRR interval (e.g., 0-5 dB, 5-10 dB, etc.). This example solves a classification task instead of regression. This provides a coarse estimation of DRR with sufficient accuracy for the use with the examples disclosed herein. The machine learning trainer 120 uses the DRR parameter in the data preparation stage. One or more impulse responses that match the target DRR values are generated. These impulse responses are convolved with speech without reverberation to produce simulated signals with a desired DRR value. The reverberated signal and a target DRR value form a training example—a pair of input and output.

Based on the comparison of the DRR with the threshold and any additional modeling based on the machine learning, the distance classifier classifies the distance between the microphone 102 and the source of the acoustic signal as near field or far field. In some examples, as disclosed above, the DRR and metrics used to determine the DRR are used in the training phase to train the distance classifier 114. In such examples, the trained distance classifier 114 classifies the user-to-microphone distances directly from the acoustic signal. In other examples, the DRR may be calculated dynamically. In other words, the distance classifier 114 analyzes an acoustic signal, determines the DRR, and classifies the user-to-microphone distance with each frame of an acoustic signal under analysis.

Based on the classification of the distance between the microphone 102 and the source of the acoustic signal, the mode selector 122 determines a processing mode to be used to process the signal. The signal processor 108 processes the signal in accordance with the mode selected by the mode selector 122. In some examples, when the distance classifier 114 classifies the distance between the microphone 102 and the source of the acoustic signal as far field, the mode selector 122 selects a first processing mode. In some examples, when the distance classifier 114 classifies the distance between the microphone 102 and the source of the acoustic signal, the mode selector 122 selects a second processing mode. In some examples, the first processing mode is a standard processing mode, and the second processing mode is a limited processing mode. In some examples, the first processing mode includes a first set of processing operations, and the second processing mode includes a second set of processing operations. In such examples, the second set includes a fewer number of processing operations than the first set. For example, in some examples, the first processing mode includes a dereverberation process, and the second processing mode lacks the dereverberation process. In other examples, the first processing mode includes a dereverberation process with a first filter, and the second processing mode includes the dereverberation process with a second filter. In such examples, the second filter may be different than the first filter. In some examples, the signal processor 108 turns off dereverberation or turns down or alters the filter length. In some examples middle distances that are on the cusp between near field or far field are processed based on an absolute classified of either near field or far field. In other examples, a middle distance could be processed with a modified processing that includes, for example, a dereverberation filter that is shorter than a long dereverberation filter of the standard processing but longer than a short (or non-existence) dereverberation filter of the limited processing. Thus, in some examples, there may be more than the two classifications of near field and far field. There may be a mid-field or neutral distance classification. Other examples may include additional numbers of classifications (i.e., more than two or three) that enable more refined or discrete distance determinations.

The mode selector 122 acts as a switch between processing modes. In some examples, the source of the acoustic signal may change distances from the microphone, resulting in an acoustic signal that changes between far field and near field. In such examples, the mode selector 122 switches operation of the signal processor 108 between the processing modes based on the changes in distance between the microphone 102 and the source of the acoustic signal.

In some examples, the acoustic signal enhancer 104 consumes a first amount of power in the first processing mode (e.g., standard processing), and the acoustic signal enhancer 104 consumers a second amount of power in the second processing mode (e.g., limited processing). In such examples, the second amount is less than the first amount. In some examples, for near-field speech, the limited processing with, for example, the dereverberation algorithm turned off or disengaged, signal quality is enhanced and the processing load of the computing device is reduced. Thus, the introduction of the reduced or limited processing improves performance of the computing device and improves the signal. In other words, use of signal processing that is adaptive to user-to-microphone distances maintains optimal signal quality for all distances. In addition, because the near field signals undergo lighter processing, the average power consumption is lower.

Tables 1A and 1B shows example results of an example study in which signal quality is measured as key phrase detection False Rejection Rate (FRR [%]) under different dereverberation (DRV) modes.

TABLE 1A

| | Far-Field | | | |
| --- | --- | --- | --- | --- |
| | Clean | Stationary Noise | External Music | CPU load |
| DRV ON | 0.90% | 6.40% | 5.90% | 100% |
| RV OFF | 0.00% | 9.50% | 11.40% | 50.79% |

TABLE 1B

| | Near-Field | | | |
| --- | --- | --- | --- | --- |
| | Clean | Stationary Noise | External Music | CPU load |
| DRV ON | 1.40% | 4.10% | 2.30% | 100% |
| DRV OFF | 0.90% | 3.60% | 2.30% | 50.79% |

For the far field distances, the better solution is to keep the dereverberation algorithms and/or filter on and to turn the dereverberation algorithms and/or filter off for the near field distances. These results show that the limited processing (e.g., DRV OFF) for near field distances leads to better signal quality and lower processing load than the standard processing. Table 2 shows the average results where the mode selector 122 switches or selects between two processing modes—one for far field distances and another for near field distances.

TABLE 2

| Quality improvement [FRR] | | Power Consumption Savings | |
| --- | --- | --- | --- |
| Far-Field | Near-Field | Far-Field | Near-Field |
| 0.00% | 0.30% | 0% | 49% |

The power consumption savings presented in example of Table 2 are the total number of operations savings in the signal processing pipeline, per a single key phrase recognition computational spike.

Figure 3A:
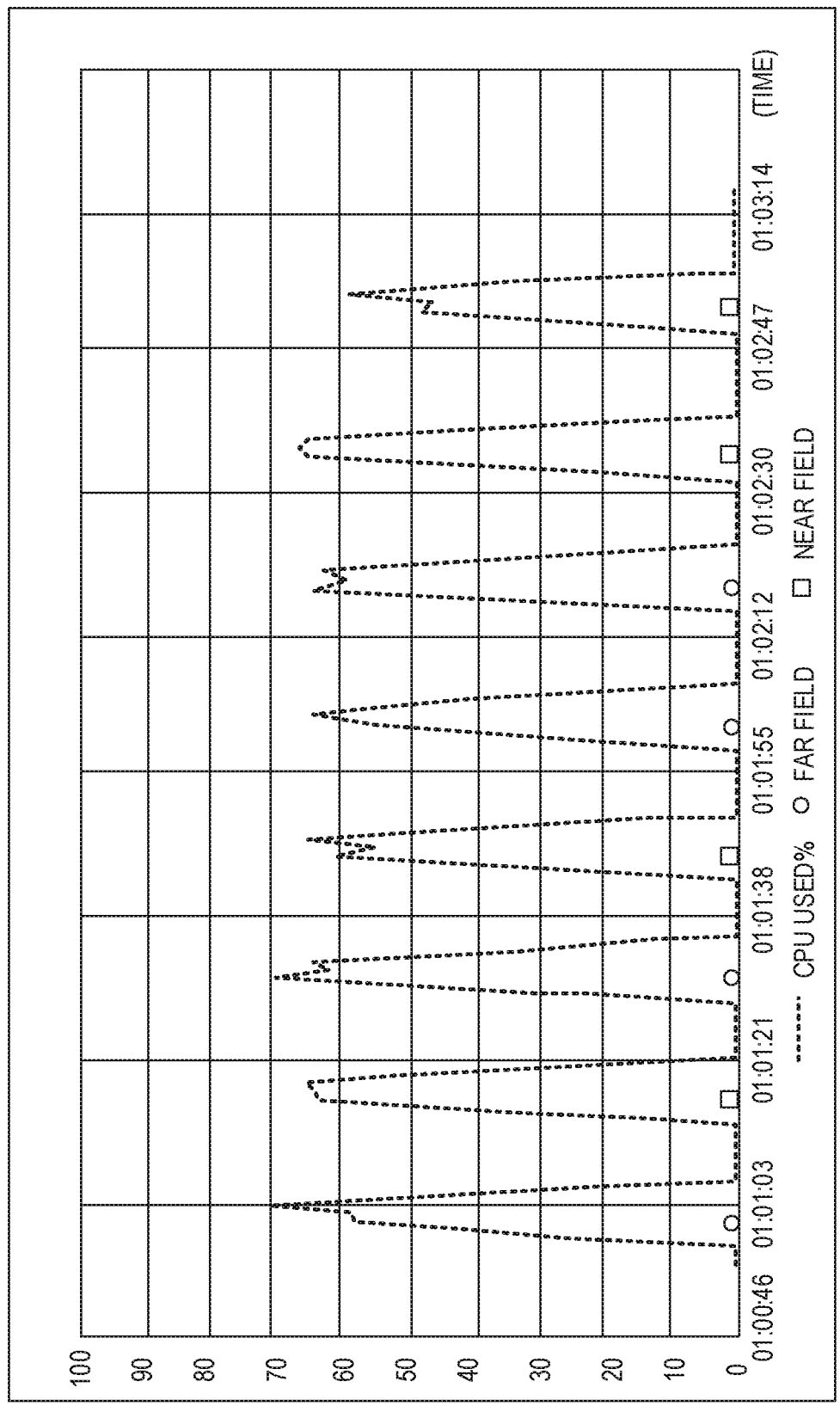
FIG. 3A is an example graph of percentages of central processing unit (CPU) usage over time for processing near field and far field acoustic signals in accordance with conventional techniques.
Figure 3B:
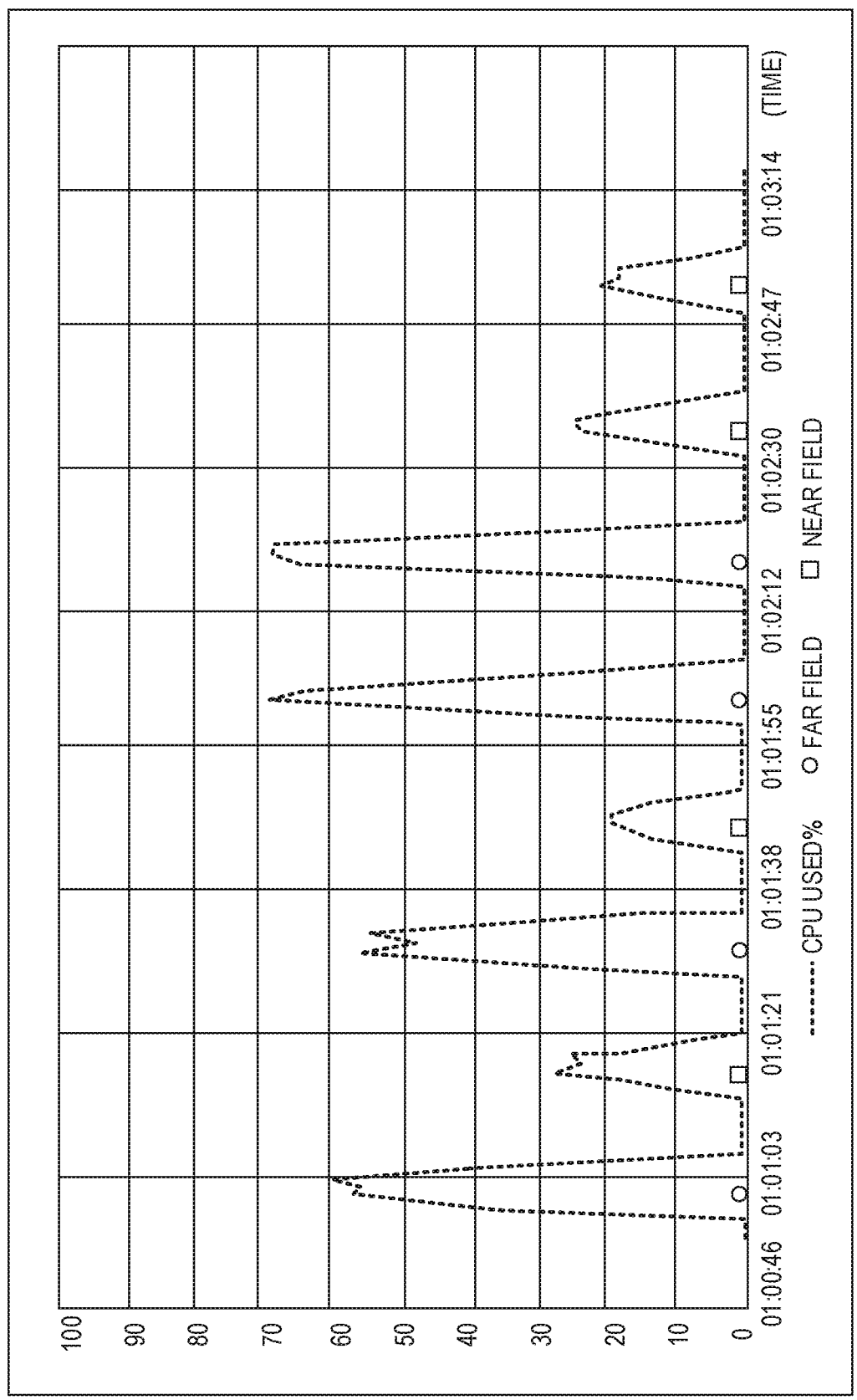
FIG. 3B is an example graph of percentages of CPU usage over time for processing near field and far field acoustic signals in accordance with the teachings of this disclosure.

FIG. 3A is an example graph of percentages of central processing unit (CPU) usage over time for processing near field and far field acoustic signals in accordance with conventional techniques. FIG. 3B is an example graph of percentages of CPU usage over time for processing near field and far field acoustic signals in accordance with the teachings of this disclosure. The graphs illustrate the power savings with the teachings of this disclosure. For example, FIG. 3A shows a CPU usage for a far field distance at point 302a using conventional techniques. FIG. 3B shows the CPU usage for a far field distance at point 302b using the techniques of this disclosure. More processing is needed to reduce reverberation and clarify an acoustic signal with a far field distance. Thus, there is relatively high CPU usage. FIG. 3A shows a CPU usage for a near field distance at point 304a using conventional techniques. FIG. 3B shows the CPU usage for a near field distance at point 304b using the techniques of this disclosure. Less processing is needed to reduce reverberation and/or otherwise clarify an acoustic signal with a near field distance compared to a far field distance. With the conventional techniques, the same signal process occurs regardless of the distance between the microphone and the source of the acoustic signal. Thus, the CPU power consumption at point 302a and point 304a are both high. With the teachings of this disclosure, less processing power is consumed when a near field signal is processed. Therefore, the CPU power consumption between point 302b and point 304b is different. Less power is consumed at point 304b.

In some examples, after the signal processor 108 processes the signal in accordance with the processing mode selected by the mode selector 122 based on the distance between the microphone 102 and the source of the acoustic signal, the phrase detector 110 may analyze the processed signal to confirm the detection of the keyword and/or key phrase. In addition, the acoustic signal enhancer 104 generates and/or transmits the output 124. For example, the acoustic signal enhancer 104 generates and/or transmits the output 124 via the transceiver 106. In some examples, the output 124 is the keyword and/or key phrase.

The keyword and/or key phrase may be used in other applications such as, for example, inside the Intel® Wake-on-Voice (WoV) key phrase detection model, ASR, VoIP communication, multimodal voice plus gesture control, user separation, proximity recognition, etc. In addition, these examples can process signals and switch processing modes during the processing of an acoustic signal pipeline in real time entirely in the audio domain on raw speech samples, and with no additional latency or computing load requirements.

In addition, while the distance classifier 114 is described as estimating or classifier the distance between the microphone 102 and the source of the acoustic signal in the examples disclosed herein, other metrics may additionally or alternatively be used. For example, in some examples the RT60 parameter may be used. In some examples, the early-to-late index (CTE) parameter may be used. In some examples, the early decay time (EDT) parameter may be used.

In the illustrated example of FIG. 1, the microphone 102 includes means for detecting a plurality of acoustic signals. In the illustrated example of FIG. 1, the microphone 102 includes means for converting an acoustic signal to an electrical signal. Additionally or alternatively, in other examples, piezoelectric duplex transducers, vibrometers, and/or lidars include means for converting an acoustic signal to an electrical signal.

In the illustrated example of FIG. 1, one or more of the acoustic signal enhancer 104, the signal processor 108, the phrase detector 110, the distance classifier 114, the estimator 116, the comparator 118, the machine learning trainer 120, and/or the mode selector 112, and/or combinations thereamong include means for processing signals. In this example, the processing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, one or more of the acoustic signal enhancer 104, the signal processor 108, the phrase detector 110, the distance classifier 114, the estimator 116, the comparator 118, the machine learning trainer 120, and/or the mode selector 112, and/or combinations thereamong implement the processing means.

While an example manner of implementing the acoustic signal enhancer 102 is illustrated in FIG. 1, one or more of the elements, processes and/or devices illustrated in FIG. 1 may be combined, divided, re-arranged, omitted, eliminated and/or implemented in any other way. Further, the example transceiver 108, the example signal processor 108, the example phrase detector 110, the example clock 112, the example distance classifier 114, the example estimator 116, the example comparator 118, the example machine learning trainer 120, the example mode selector 122, and/or, more generally, the example acoustic signal enhancer 102 of FIG. 1 may be implemented by hardware, software, firmware and/or any combination of hardware, software and/or firmware. Thus, for example, any of the example transceiver 108, the example signal processor 108, the example phrase detector 110, the example clock 112, the example distance classifier 114, the example estimator 116, the example comparator 118, the example machine learning trainer 120, the example mode selector 122, and/or, more generally, the example acoustic signal enhancer 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transceiver 108, the example signal processor 108, the example phrase detector 110, the example clock 112, the example distance classifier 114, the example estimator 116, the example comparator 118, the example machine learning trainer 120, the example mode selector 122, and/or, the example acoustic signal enhancer 102 is/are hereby expressly defined to include a non-transitory computer readable storage device or storage disk such as a memory, a digital versatile disk (DVD), a compact disk (CD), a Blu-ray disk, etc. including the software and/or firmware. Further still, the example acoustic signal enhancer 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
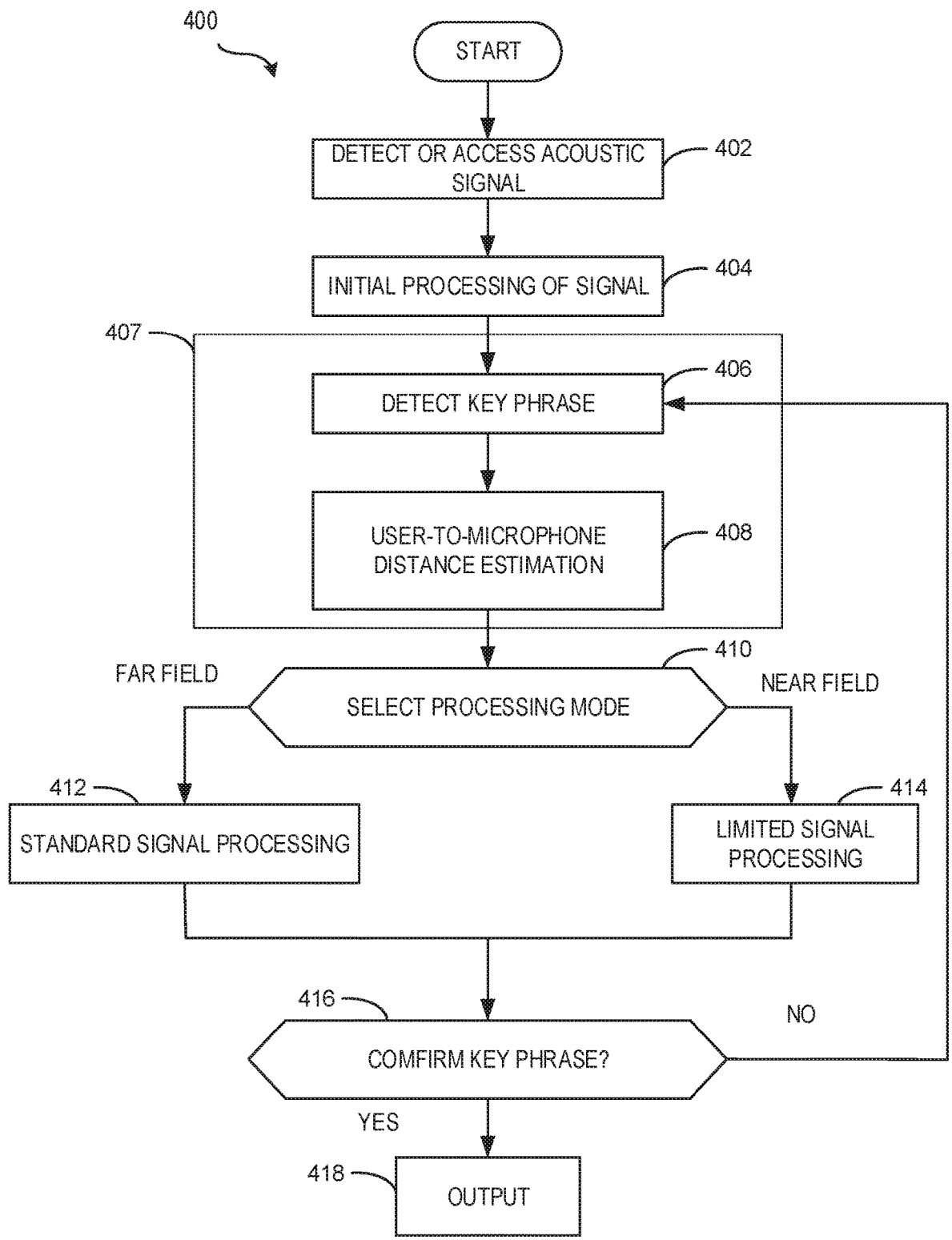
FIG. 4 is a flowchart representative of machine readable instructions which may be executed to implement the example acoustic signal enhancer of FIG. 1.
Figures 5A, 5B:
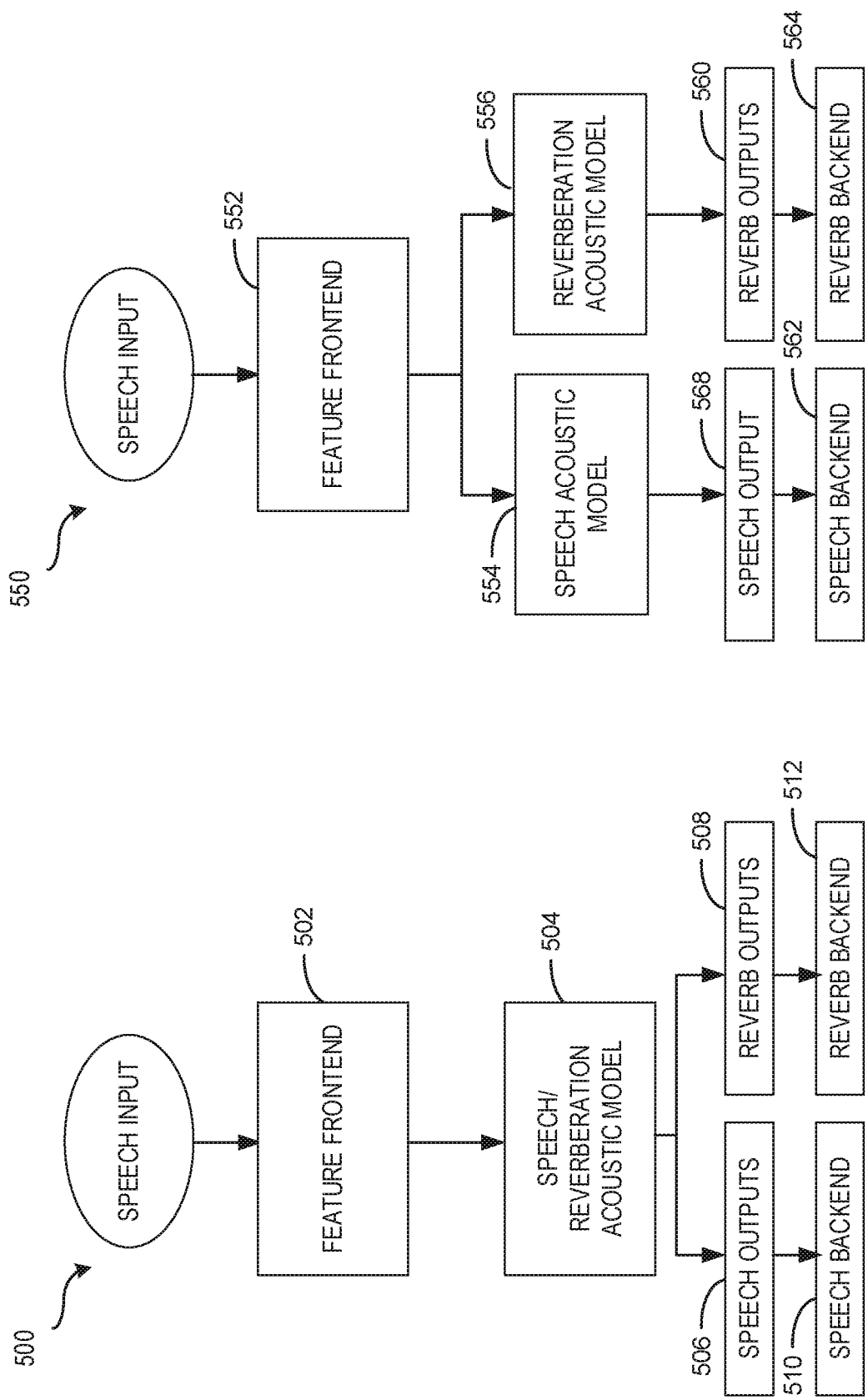
FIG. 5A is a flowchart representative of machine readable instructions which may be executed to implement the example acoustic signal enhancer of FIG. 1 to perform the example user-to-microphone distance estimation and key phrase detection of the example instructions of FIG. 4.
FIG. 5B is a flowchart representative of alternative machine readable instructions which may be executed to implement the example acoustic signal enhancer of FIG. 1 to perform the example user-to-microphone distance estimation and key phrase detection of the example instructions of FIG. 4.

Flowcharts representative of example hardware logic, machine readable instructions, hardware implemented state machines, and/or any combination thereof for implementing the acoustic signal enhancer 102 of FIG. 1 are shown in FIGS. 4, 5A, and 5B. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4, 5A, and 5B many other methods of implementing the example acoustic signal enhancer 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5A, and 5B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions which may be executed to implement the example acoustic signal enhancer 104 of FIG. 1. The example process 400 of FIG. 4 includes the microphone 102 detecting an acoustic signal such as for example speech and/or the acoustic signal enhancer 104 access the acoustic signal and/or the electrical signal representative of and/or derived from the acoustic signal (block 402). The signal processor 108 of the acoustic signal enhancer 104 initially processes the signal (block 404). For example, the signal processor 108 can remove background noise to enhance clarity of the signal.

The phrase detector 110 detects a key phrase in the signal (block 406). In some examples the phrase detector 110 detects a key word. The detection of the key phrase or key word indicates that the acoustic signal includes speech.

The example process 400 also includes estimation of the user-to-microphone distance (block 408). For example, the distance classifier 114 classifies the distance between a user or person who is the source of the acoustic signal and the microphone 102. In some examples, the distance classifier 114 analyzes the acoustic signal, identifies features in one or more frames, and estimates the user-to-microphone distance based on the energy of the features. In some examples, the machine learning trainer 120 trains the distance classifier 114 based on a machine learning training model that calculates and analyzes the DRR metric as disclosed above. Further details of the operation of the distance classifier 114 to estimate and classify the distance between the microphone 102 and the source of the acoustic signal (e.g., the user) is disclosed below with FIGS. 5A and 6B.

Based on the estimation and classification of the distance between the microphone 102 and the source of the acoustic signal, the mode selector 122 selects a signal processing mode for further processing of the signal (block 410). For example, for a far field distance between the microphone 102 and the source of the acoustic signal, the mode selector 112 selects a processing mode that includes operations to clarify the signal such as, for example, dereverberation. For a near field distance between the microphone 102 and the source of the acoustic signal, the mode selector 122 selects an alternative processing that includes fewer operations and/or less detailed or involved operations to the clarify the signal. For example, for a near field distance between the microphone 102 and the source of the acoustic signal, the mode selector 122 selects a processing mode that clears the signal without a dereverberation process or with a dereverberation process that includes a shorter filter than a filter used in the dereverberation process for a far field signal. The labels "standard" processing mode and "limited" processing mode are used here to distinguish between the first processing mode (used for far field distances) and the second processing mode (used for near field distances). These terms are used to indicate that the processing mode use for near field distances is less complex and less computationally heavy than the processing mode used for far field distances.

Based on the mode selected by the mode selector 122, the signal processor 108 implements the corresponding processing mode. For example, when the distance between the microphone 102 and the source of the acoustic signal is far field, the signal processor 108 processed the signal with standard signal processing (block 412). When the distance between the microphone 102 and the source of the acoustic signal is near field, the signal processor 108 processed the signal with limited signal processing (block 414).

After standard processing and/or limited processing, the signal has been cleared including, for example, removal of reverberations. The key phrase detector 110 analyzes the clarified signal after standard processing or limited processing and determines if the key phrase (or key word) is confirmed (block 416). If the key phrase or key word is not confirmed, the process 400 continues with the key phrase detector 110 analyzing the signal to identify key word(s) and/or key phrase(s) (block 406). If the key phrase detector 110 confirms the key phrase or key word from the clarified signal (block 416), the acoustic signal enhancer 104 generates and transmits the output 124 indicative of the key phrase or key word. For example, the acoustic signal enhancer 104 communicates the output 124 via the transceiver 106. In some examples, the output 124 includes an alert such as, for example, an audible ping sound that is communicated by the transceiver 106. In some examples, the output 124 is used for further processing in additional or subsequent speech processing algorithms. For example, the output 124 of an automatic speech recognition process may be used in a natural language processing algorithm to extract user intent.

FIG. 5A is a flowchart representative of machine readable instructions and a process 500 which may be executed to implement the example acoustic signal 104 enhancer of FIG. 1 to perform the example user-to-microphone distance estimation and key phrase detection (block 407) of the example instructions of FIG. 4. FIG. 5B is a flowchart representative of alternative machine readable instructions and a process 550 which may be executed to implement the example acoustic signal enhancer 104 of FIG. 1 to perform the example user-to-microphone distance estimation and key phrase detection (block 407) of the example instructions of FIG. 4.

The example process 500 of FIG. 5A and the example process 550 of FIG. 5B include the signal processor 108 determining feature frontend (blocks 502, 552). In determining the feature frontend, the signal processor 108 computes audio features from the acoustic signal including, for example, filterbank, Fast Fourier Transform, energy of frequency bands, and other features.

FIG. 5A includes the key phrase detector 110 and the distance classifier 114 implementing a speech/reverberation acoustic model (block 504). The acoustic model classifies the phoneme in the audio stream based on energy of the acoustic signal and connects the phoneme into phrases as the speech outputs. The reverberation model applies filtering and/or other signal processing techniques to identify at least one of reverberation characteristics (e.g., the DRR) in the acoustic signal and/or the user-to-microphone distance. In the example process 500, the acoustic model and reverberation model are fully integrated, trained together, and share the entire model architecture or structure.

Alternatively, the process 550 of FIG. 5B includes the key phrase detector 110 implementing a speech acoustic model (block 554). The process 550 includes the distance classifier 114 implementing the reverberation acoustic model (block 556). In the example process 550, the acoustic model and reverberation model share the feature frontend. However, in the example process 550, the speech acoustic model and the reverberation acoustic model operate in parallel.

Both of the example processes 500, 550 retain separate output targets with separate decision-making backend of the acoustic signal enhancer 104. Both of the example processes 500, 550 lead to joined training with two simultaneous backends working in parallel. The backends include the acoustic signal enhancer 104 generating and communicating the output 124. The output 124 may include the speech outputs (506, 558) and the reverberation outputs (508, 560). The speech outputs include, for example, key words and/or key phrases. The reverberation outputs include the DRR, the DRR threshold compliance, the microphone-to-user distance estimation, the microphone-to-user distance classifications, and/or other data related to reverberation or other signal quality metrics. With the speech backend (blocks 510, 562) and the reverberation backend (blocks 512, 564), the distance classifier 114 filters the information from the model(s) and aggregates the classification decision.

Figure 6:
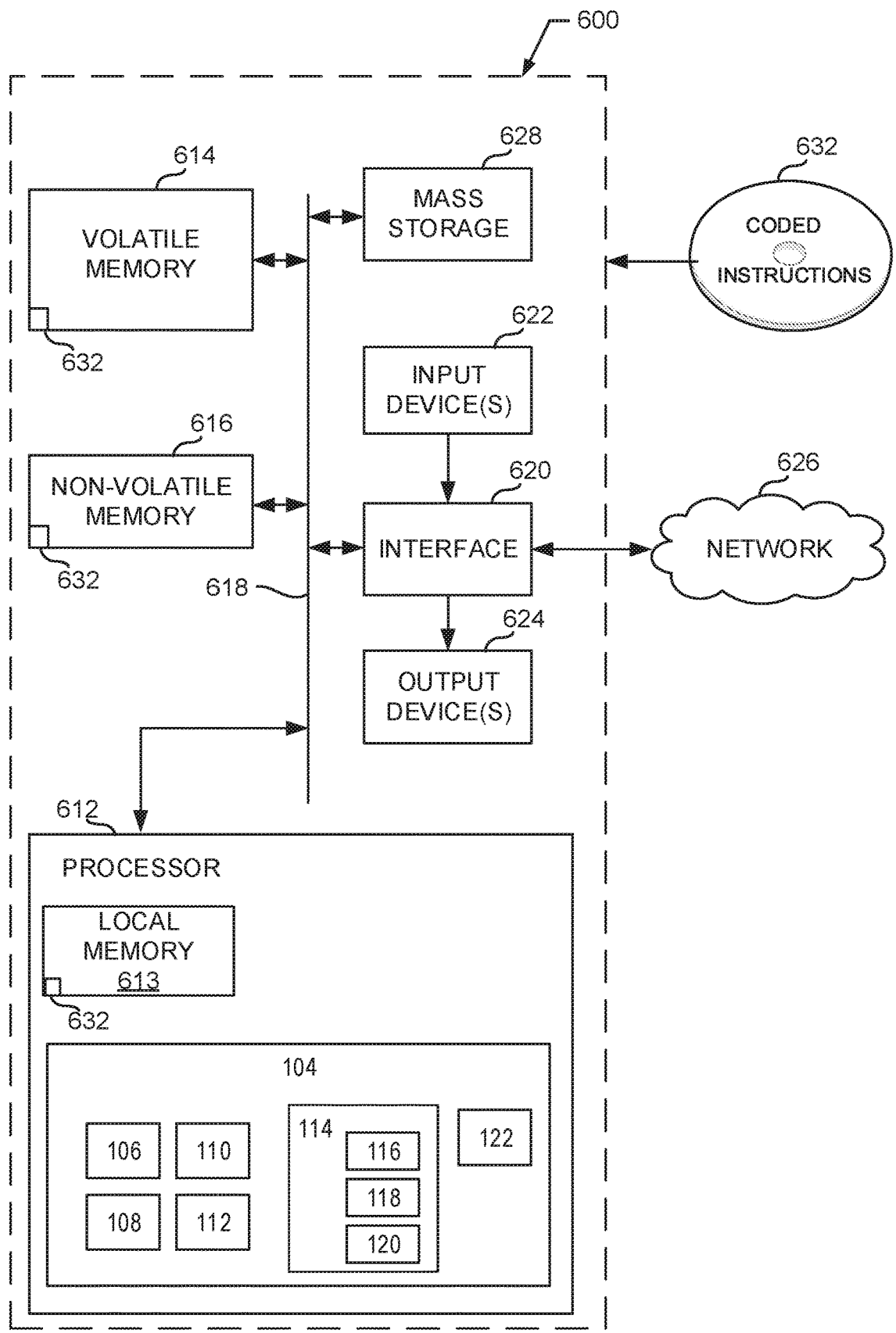
FIG. 6 is a block diagram of an example processing platform structured to execute the instructions of FIGS. 4, 5A, and 5B to implement the example acoustic signal enhancer of FIG. 1.

FIG. 6 is a block diagram of an example processor platform 1000 structured to execute the instructions of FIGS. 4, 5A, and 5B to implement the apparatus of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, a smart speaker, a smart refrigerator, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the transceiver 108, the signal processor 108, the phrase detector 110, the clock 112, the distance classifier 114, the estimator 116, the comparator 118, the machine learning trainer 120, the mode selector 122, and the acoustic signal enhancer 102.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4, 5, 6A, and 6B may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that adapt signal processing operations based on a distance between a microphone or other acoustic capture device a source of an acoustic signal including, for example, a user or person producing speech. The disclosed methods, apparatus and articles of manufacture improve the efficiency of using a computing device by determining the distance between the microphone and the source of the acoustic signal, classifying the signal, and selecting or changing a signal processing mode based in the classification. In situations in which the microphone-to-user distance is near field, the acoustic signal presents less reverberation and, therefore, less processing power and resources are needed to clarify the signal (e.g., via a dereverberation algorithm). Thus, when a computing device is to process a signal from a near field microphone-to-user distance, the computing device can use limited signal processed and, thus, conserve power and resources. The disclosed methods, apparatus and articles of manufacture are accordingly directed to one or more improvement(s) in the functioning of a computer. The examples of this disclosure also extend battery life of the computing device that processes the acoustic signals.

Example 1 includes a system that includes a microphone to convert an acoustic signal to an electrical signal. The system of Example 1 also includes one or more processors to: estimate a distance between a source of the acoustic signal and the microphone; select a signal processing mode based on the distance; and process the electrical signal in accordance with the selected processing mode.

Example 2 includes the system of Example 1, and optionally includes the one or more processors to estimate the distance directly from the acoustic signal.

Example 3 incudes the system of any of Example 1 or 2, and optionally includes the one or more processors to use a neural network to estimate the distance directly from the acoustic signal.

Example 4 includes the system of any of Examples 1-3, and optionally includes the processor to estimate the distance as one of near-field or far-field.

Example 5 includes the system of any of Examples 1-4, and optionally includes the one or more processors to: select a first processing mode as the selected processing mode when the distance is near field; and select a second processing mode as the selected processing mode when the distance is far field.

Example 6 includes the system of any of Examples 1-5, and optionally includes the one or more processors to calculate a direct-to-reverberant ratio (DRR) of the acoustic signal and estimate the distance based on the DRR.

Example 7 includes the system of any of Examples 1-6, and optionally includes the one or more processors to: determine an impulse response of the source and the microphone; determine a time of a direct pulse; calculate the DRR based on the impulse response and the time of the direct pulse.

Example 8 includes the system of any of Examples 1-7, and optionally includes the one or more processors to: classify the distance as near field when the DRR is greater than zero; and classify the distance as far field when the DRR is less than zero.

Example 9 includes the system of any of Examples 1-8, and optionally includes the one or more processors to: select a first processing mode as the selected processing mode when the distance is near field; and select a second processing mode as the selected processing mode when the distance is far field.

Example 10 includes the system of any of Examples 1-9, and optionally includes the one or more processors to: compare the distance to a threshold; select a first processing mode as the selected processing mode when the distance is less than the threshold; and select a second processing mode as the selected processing mode when the distance is greater than the threshold.

Example 11 includes the system of any of Examples 1-10, and optionally includes the first processing mode including a first set of processing operations and the second processing mode including a second set of processing operations, the first set including a fewer number of processing operations than the second set.

Example 12 includes the system of any of Examples 1-11, and optionally includes the second processing mode including a dereverberation process, and the first processing mode lacking the dereverberation process.

Example 13 includes the system of any of Examples 1-12, and optionally includes the first processing mode including a dereverberation process with a first filter, and the second processing mode including the dereverberation process with a second filter, the second filter different than the first filter.

Example 14 includes the system of any of Examples 1-13, and optionally includes the one or more processors to consume a first amount of power in the first processing mode, and the one or more processors to consume a second amount of power in the second processing mode, the second amount greater than the first amount.

Example 15 includes a system that includes means for converting an acoustic signal to an electrical signal; and means for processing signals, the processing means to: estimate a distance between a source of the acoustic signal and the converting means; select a signal processing mode based on the distance; and process the electrical signal in accordance with the selected processing mode.

Example 16 includes the system of Example 15, and optionally includes the processing means to estimate the distance directly from the acoustic signal.

Example 17 includes the system of any of Examples 15 or 16, and optionally includes the processing means to use a neural network to estimate the distance directly from the acoustic signal.

Example 18 includes the system of any of Examples 15-17, and optionally includes the processing means to estimate the distance as one of near-field or far-field.

Example 19 includes the system of any of Examples 15-18, and optionally includes the processing means to: select a first processing mode as the selected processing mode when the distance is near field; and select a second processing mode as the selected processing mode when the distance is far field.

Example 20 includes the system of any of Examples 15-19, and optionally includes the processing means to calculate a direct-to-reverberant ratio (DRR) of the acoustic signal and estimate the distance based on the DRR.

Example 21 includes the system of any of Examples 15-20, and optionally includes the processing means to: determine an impulse response of the source and the microphone; determine a time of a direct pulse; calculate the DRR based on the impulse response and the time of the direct pulse.

Example 22 includes the system of any of Examples 15-21, and optionally includes the processing means to: classify the distance as near field when the DRR is greater than zero; and classify the distance as far field when the DRR is less than zero.

Example 23 includes the system of any of Examples 15-22, and optionally includes the processing means to: select a first processing mode as the selected processing mode when the distance is near field; and select a second processing mode as the selected processing mode when the distance is far field.

Example 24 includes the system of any of Examples 15-23, and optionally includes the processing means to: compare the distance to a threshold; select a first processing mode as the selected processing mode when the distance is less than the threshold; and select a second processing mode as the selected processing mode when the distance is greater than the threshold.

Example 25 includes the system of any of Examples 15-24, and optionally includes the first processing mode including a first set of processing operations and the second processing mode including a second set of processing operations, the first set including a fewer number of processing operations than the second set.

Example 26 includes the system of any of Examples 15-25, and optionally includes the second processing mode including a dereverberation process, and the first processing mode lacking the dereverberation process.

Example 27 includes the system of any of Examples 15-26, and optionally includes the first processing mode including a dereverberation process with a first filter, and the second processing mode including the dereverberation process with a second filter, the second filter different than the first filter.

Example 28 includes the system of any of Examples 15-27, and optionally includes the processing means to consume a first amount of power in the first processing mode, and the processing means to consume a second amount of power in the second processing mode, the second amount greater than the first amount.

Example 29 includes an apparatus that includes processor circuitry; and a memory including instructions which, when executed, cause the processor circuitry to: estimate a distance between a source of an acoustic signal and a microphone that detected the acoustic signal; select a signal processing mode based on the distance; and process an electrical signal representative of the acoustic signal in accordance with the selected processing mode.

Example 30 includes the system of Example 29, and optionally includes the processing circuitry to estimate the distance directly from the acoustic signal.

Example 31 includes the system of any of Examples 29 or 30, and optionally includes the processing circuitry to use a neural network to estimate the distance directly from the acoustic signal.

Example 32 includes the system of any of Examples 29-31, and optionally includes the processing circuitry to estimate the distance as one of near-field or far-field.

Example 33 includes the system of any of Examples 29-32, and optionally includes the processing circuitry to: select a first processing mode as the selected processing mode when the distance is near field; and select a second processing mode as the selected processing mode when the distance is far field.

Example 34 includes the apparatus of any of Examples 29-33, and optionally includes the processing circuitry to calculate a direct-to-reverberant ratio (DRR) of the acoustic signal and estimate the distance based on the DRR.

Example 35 includes the apparatus of any of Examples 29-342, and optionally includes the processing circuitry to: determine an impulse response of the source and the microphone; determine a time of a direct pulse; and calculate the DRR based on the impulse response and the time of the direct pulse.

Example 36 includes the apparatus of any of Examples 29-35, and optionally includes the processing circuitry to: classify the distance as near field when the DRR is greater than zero; and classify the distance as far field when the DRR is less than zero.

Example 37 includes the apparatus of any of Examples 39-36, and optionally includes the processing circuitry to: select a first processing mode as the selected processing mode when the distance is near field; and select a second processing mode as the selected processing mode when the distance is far field.

Example 38 includes the apparatus of any of Examples 29-37, and optionally includes the processing circuitry to: compare the distance to a threshold; select a first processing mode as the selected processing mode when the distance is less than the threshold; and select a second processing mode as the selected processing mode when the distance is greater than the threshold.

Example 39 includes the apparatus of any of Examples 29-38, and optionally includes the first processing mode including a first set of processing operations and the second processing mode including a second set of processing operations, the first set including a fewer number of processing operations than the second set.

Example 40 includes the apparatus of any of Examples 29-39, and optionally includes the second processing mode including a dereverberation process, and the first processing mode lacking the dereverberation process.

Example 41 includes the apparatus of any of Examples 29-40, and optionally includes the first processing mode including a dereverberation process with a first filter, and the second processing mode including the dereverberation process with a second filter, the second filter different than the first filter.

Example 42 includes the apparatus of any of Examples 29-41, and optionally includes the processing circuitry to: consume a first amount of power in the first processing mode; and consume a second amount of power in the second processing mode, the second amount greater than the first amount.

Example 43 includes a non-transitory computer readable storage medium comprising instructions which, when executed, cause one or more processors to at least: estimate a distance between a source of an acoustic signal and a microphone that detected the acoustic signal; select a signal processing mode based on the distance; and process an electrical signal representative of the acoustic signal in accordance with the selected processing mode.

Example 44 includes the storage medium of Example 32, and optionally includes the instructions causing the one or more processors to estimate the distance directly from the acoustic signal.

Example 45 includes the storage medium of any of Examples 43 or 44, and optionally includes the instructions causing the one or more processors to use a neural network to estimate the distance directly from the acoustic signal.

Example 46 includes the storage medium of any of Examples 43-45, and optionally includes the instructions causing the one or more processors to estimate the distance as one of near-field or far-field.

Example 47 includes the storage medium of any of Examples 43-46, and optionally includes the instructions causing the one or more processors to: select a first processing mode as the selected processing mode when the distance is near field; and select a second processing mode as the selected processing mode when the distance is far field.

Example 48 includes the storage medium of Examples 43-47, and optionally includes the instructions causing the one or more processors to calculate a direct-to-reverberant ratio (DRR) of the acoustic signal and estimate the distance based on the DRR.

Example 49 includes the storage medium of any of Examples 43-48, and optionally includes the instructions causing the one or more processors to: determine an impulse response of the source and the microphone; determine a time of a direct pulse; and calculate the DRR based on the impulse response and the time of the direct pulse.

Example 50 includes the storage medium of any of Examples 43-49, and optionally includes the instructions causing the one or more processors to: classify the distance as near field when the DRR is greater than zero; and classify the distance as far field when the DRR is less than zero.

Example 51 includes the storage medium of any of Examples 43-50, and optionally includes the instructions causing the one or more processors to: select a first processing mode as the selected processing mode when the distance is near field; and select a second processing mode as the selected processing mode when the distance is far field.

Example 52 includes the storage medium of any of Examples 43-51, and optionally includes the instructions causing the one or more processors to: compare the distance to a threshold; select a first processing mode as the selected processing mode when the distance is less than the threshold; and select a second processing mode as the selected processing mode when the distance is greater than the threshold.

Example 53 includes the storage medium of any of Examples 43-52, and optionally includes the first processing mode including a first set of processing operations and the second processing mode including a second set of processing operations, the first set including a fewer number of processing operations than the second set.

Example 54 includes the storage medium of any of Examples 43-53, and optionally includes the second processing mode including a dereverberation process, and the first processing mode lacking the dereverberation process.

Example 55 includes the storage medium of any of Examples 43-54, and optionally includes the first processing mode including a dereverberation process with a first filter, and the second processing mode including the dereverberation process with a second filter, the second filter different than the first filter.

Example 56 includes the storage medium of any of Examples 43-55, and optionally includes the instructions causing the one or more processors to: consume a first amount of power in the first processing mode; and consume a second amount of power in the second processing mode, the second amount greater than the first amount.

Example 57 includes a method that includes converting an acoustic signal to an electrical signal; estimating, by executing instructions with one or more processors, a distance between a source of the acoustic signal and the microphone; selecting, by executing instructions with the one or more processors, a signal processing mode based on the distance; and processing by executing instructions with the one or more processors, the electrical signal in accordance with the selected processing mode.

Example 58 include the method of Example 57, and optionally includes the estimating of the distance including estimating the distance directly from the acoustic signal.

Example 59 includes the method of any of Examples 57 or 58, and optionally includes the estimating of the distance including using a neural network to estimate the distance directly from the acoustic signal.

Example 60 includes method of any of Examples 57-59, and optionally includes the estimating of the distance including estimating the distance as one of near-field or far-field.

Example 61 includes the method of any of Examples 57-60, and optionally includes the selecting of the signal processing mode including: selecting a first processing mode as the selected processing mode when the distance is near field; and selecting a second processing mode as the selected processing mode when the distance is far field.

Example 62 includes the method of Example 57-61, and optionally includes calculating, by executing instructions with the one or more processors, a direct-to-reverberant ratio (DRR) of the acoustic signal, and estimating, by executing instructions with the one or more processors, the distance based on the DRR.

Example 63 includes the method of any of Examples 57-62, and optionally includes determining, by executing instructions with the one or more processors, an impulse response of the source and the microphone; determining, by executing instructions with the one or more processors, a time of a direct pulse; and calculating, by executing instructions with the one or more processors, the DRR based on the impulse response and the time of the direct pulse.

Example 64 includes the method of any of Examples 57-63, and optionally includes classifying, by executing instructions with the one or more processors, the distance as near field when the DRR is greater than zero; and classifying, by executing instructions with the one or more processors, the distance as far field when the DRR is less than zero.

Example 65 includes the method of any of Examples 57-64, and optionally includes selecting, by executing instructions with the one or more processors a first processing mode as the selected processing mode when the distance is near field; and selecting, by executing instructions with the one or more processors, a second processing mode as the selected processing mode when the distance is far field.

Example 66 includes the method of any of Examples 57-65, and optionally includes comparing, by executing instructions with the one or more processors, the distance to a threshold; selecting, by executing instructions with the one or more processors, a first processing mode as the selected processing mode when the distance is less than the threshold; and selecting, by executing instructions with the one or more processors, a second processing mode as the selected processing mode when the distance is greater than the threshold.

Example 67 includes the method of any of Examples 57-66, and optionally includes the first processing mode including a first set of processing operations and the second processing mode including a second set of processing operations, the first set including a fewer number of processing operations than the second set.

Example 68 includes the method of any of Examples 57-67, and optionally includes the second processing mode including a dereverberation process, and the first processing mode lacking the dereverberation process.

Example 69 includes the method of any of Examples 57-68, and optionally includes the first processing mode including a dereverberation process with a first filter, and the second processing mode including the dereverberation process with a second filter, the second filter different than the first filter.

Example 70 includes the method of any of Examples 57-69, and optionally includes consuming a first amount of power in the first processing mode, and the one or more processors is to consuming a second amount of power in the second processing mode, the second amount greater than the first amount.

Example 71 includes a system to reduce power consumption of a computing device. The system of Example 71 includes a microphone to detect a plurality of acoustic signals; and one or more processors to: estimate a first distance between a first source of a first acoustic signal of the plurality of acoustic signals and the microphone; select a first signal processing mode based on the first distance, the system to consume a first amount of power in the first signal processing mode; estimate a second distance between a second source of a second acoustic signal of the plurality of acoustic signals and the microphone, the second distance different than the first distance; and switch to a second signal processing mode based on the second distance, the system to consume a second amount of power in the second signal processing mode, the second amount of power different than the first amount of power.

Example 72 includes the system of Example 71, and optionally includes the one or more processors to: estimate the first distance by: determining a first impulse response of the first acoustic signal; determining a first time of a first direct pulse of the first acoustic signal; calculating a first DRR based on the first impulse response and the first time of the first direct pulse; classifying the first distance as near field when the first DRR is greater than zero; and classifying the first distance as far field when the first DRR is less than zero; estimate the second distance by: determining a second impulse response of the second acoustic signal; determining a second time of a second direct pulse of the second acoustic signal; calculating a second DRR based on the second impulse response and the second time of the second direct pulse; classifying the second distance as near field when the second DRR is greater than zero; and classifying the second distance as far field when the second DRR is less than zero; select the first processing mode when the first distance is near field; and select the second processing mode when the second distance is far field.

Example 73 includes the system of any of Examples 71 or 72, and optionally includes the first processing mode including a first set of processing operations and the second processing mode including a second set of processing operations, the second set including a greater number of processing operations than the first set.

Example 74 includes the system of any of Examples 71-73, and optionally includes the second processing mode including a dereverberation process, and the first processing mode lacking the dereverberation process.

Example 75 includes the system of any of Examples 71-74, and optionally includes the first processing mode including a dereverberation process with a first filter, and the second processing mode including the dereverberation process with a second filter, the second filter different than the first filter.

Example 76 includes a system to reduce power consumption of a computing device. The system of Example 76 includes means for detecting a plurality of acoustic signals; and means for processing signals, the processing means to: estimate a first distance between a first source of a first acoustic signal of the plurality of acoustic signals and the microphone; select a first signal processing mode based on the first distance, the system to consume a first amount of power in the first signal processing mode; estimate a second distance between a second source of a second acoustic signal of the plurality of acoustic signals and the microphone, the second distance different than the first distance; and switch to a second signal processing mode based on the second distance, the system to consume a second amount of power in the second signal processing mode, the second amount of power different than the first amount of power.

Example 77 includes the system of Example 76, and optionally includes the processing means to: estimate the first distance by: determining a first impulse response of the first acoustic signal; determining a first time of a first direct pulse of the first acoustic signal; calculating a first DRR based on the first impulse response and the first time of the first direct pulse; classifying the first distance as near field when the first DRR is greater than zero; and classifying the first distance as far field when the first DRR is less than zero; estimate the second distance by: determining a second impulse response of the second acoustic signal; determining a second time of a second direct pulse of the second acoustic signal; calculating a second DRR based on the second impulse response and the second time of the second direct pulse; classifying the second distance as near field when the second DRR is greater than zero; and classifying the second distance as far field when the second DRR is less than zero; select the first processing mode when the first distance is near field; and select the second processing mode when the second distance is far field.

Example 78 includes the system of any of Examples 76 or 77, and optionally includes the first processing mode including a first set of processing operations and the second processing mode including a second set of processing operations, the second set including a greater number of processing operations than the first set.

Example 79 includes the system of any of Examples 76-78, and optionally includes the second processing mode including a dereverberation process, and the first processing mode lacking the dereverberation process.

Example 80 includes the system of any of Examples 76-79, and optionally includes first processing mode including a dereverberation process with a first filter, and the second processing mode including the dereverberation process with a second filter, the second filter different than the first filter.

Example 81 includes an apparatus to reduce power consumption of a computing device. The apparatus of Example 81 includes processor circuitry; and a memory including instructions which, when executed, cause the processor circuitry to: estimate a first distance between a first source of a first acoustic signal of the plurality of acoustic signals and the microphone; select a first signal processing mode based on the first distance, the apparatus to consume a first amount of power in the first signal processing mode; estimate a second distance between a second source of a second acoustic signal of the plurality of acoustic signals and the microphone, the second distance different than the first distance; and switch to a second signal processing mode based on the second distance, the apparatus to consume a second amount of power in the second signal processing mode, the second amount of power different than the first amount of power.

Example 82 includes the apparatus of Example 81, and optionally includes the processing circuitry to: estimate the first distance by: determining a first impulse response of the first acoustic signal; determining a first time of a first direct pulse of the first acoustic signal; calculating a first DRR based on the first impulse response and the first time of the first direct pulse; classifying the first distance as near field when the first DRR is greater than zero; and classifying the first distance as far field when the first DRR is less than zero; estimate the second distance by: determining a second impulse response of the second acoustic signal; determining a second time of a second direct pulse of the second acoustic signal; calculating a second DRR based on the second impulse response and the second time of the second direct pulse; classifying the second distance as near field when the second DRR is greater than zero; and classifying the second distance as far field when the second DRR is less than zero; select the first processing mode when the first distance is near field; and select the second processing mode when the second distance is far field.

Example 83 includes the apparatus of any of Examples 81 or 82, and optionally includes the first processing mode including a first set of processing operations and the second processing mode including a second set of processing operations, the second set including a greater number of processing operations than the first set.

Example 84 includes the apparatus of any of Examples 81-83, and optionally includes the second processing mode including a dereverberation process, and the first processing mode lacking the dereverberation process.

Example 85 includes the apparatus of any of Examples 81-84, and optionally includes the first processing mode including a dereverberation process with a first filter, and the second processing mode including the dereverberation process with a second filter, the second filter different than the first filter.

Example 86 includes a non-transitory computer readable storage medium comprising instructions which, when executed, cause one or more processors to at least: estimate a first distance between a first source of a first acoustic signal of a plurality of acoustic signals and a microphone that detected the plurality of acoustic signals; select a first signal processing mode based on the first distance, the one or more processors to consume a first amount of power in the first signal processing mode; estimate a second distance between a second source of a second acoustic signal of the plurality of acoustic signals and the microphone, the second distance different than the first distance; and switch to a second signal processing mode based on the second distance, the one or more processors to consume a second amount of power in the second signal processing mode, the second amount of power different than the first amount of power.

Example 87 includes the storage medium of Example 86, and optionally includes the instructions causing the one or more processors to: estimate the first distance by: determining a first impulse response of the first acoustic signal; determining a first time of a first direct pulse of the first acoustic signal; calculating a first DRR based on the first impulse response and the first time of the first direct pulse; classifying the first distance as near field when the first DRR is greater than zero; and classifying the first distance as far field when the first DRR is less than zero; estimate the second distance by: determining a second impulse response of the second acoustic signal; determining a second time of a second direct pulse of the second acoustic signal; calculating a second DRR based on the second impulse response and the second time of the second direct pulse; classifying the second distance as near field when the second DRR is greater than zero; and classifying the second distance as far field when the second DRR is less than zero; select the first processing mode when the first distance is near field; and select the second processing mode when the second distance is far field.

Example 88 includes the storage medium of any of Examples 86 or 87, and optionally includes the first processing mode including a first set of processing operations and the second processing mode including a second set of processing operations, the second set including a greater number of processing operations than the first set.

Example 89 includes the storage medium of any of Examples 86-88, and optionally includes the second processing mode including a dereverberation process, and the first processing mode lacking the dereverberation process.

Example 90 includes the storage medium of any of Examples 86-89 and optionally includes the first processing mode including a dereverberation process with a first filter, and the second processing mode including the dereverberation process with a second filter, the second filter different than the first filter.

Example 91 includes a method to reduce power consumption of a computing device. The method of Example 91 includes estimating, by executing instructions with one or more processors, a first distance between a first source of a first acoustic signal of a plurality of acoustic signals and a microphone that detected the plurality of acoustic signals; selecting, by executing instructions with one or more processors, a first signal processing mode based on the first distance, the one or more processors to consume a first amount of power in the first signal processing mode; estimating, by executing instructions with one or more processors, a second distance between a second source of a second acoustic signal of the plurality of acoustic signals and the microphone, the second distance different than the first distance; and switching, by executing instructions with one or more processors, to a second signal processing mode based on the second distance, the one or more processors to consume a second amount of power in the second signal processing mode, the second amount of power different than the first amount of power.

Example 92 includes the method of Example 91, and optionally includes the estimating of the first distance including: determining a first impulse response of the first acoustic signal; determining a first time of a first direct pulse of the first acoustic signal; calculating a first DRR based on the first impulse response and the first time of the first direct pulse; classifying the first distance as near field when the first DRR is greater than zero; and classifying the first distance as far field when the first DRR is less than zero; the estimating of the second distance including: determining a second impulse response of the second acoustic signal; determining a second time of a second direct pulse of the second acoustic signal; calculating a second DRR based on the second impulse response and the second time of the second direct pulse; classifying the second distance as near field when the second DRR is greater than zero; and classifying the second distance as far field when the second DRR is less than zero, the method further including: selecting, by executing instructions with one or more processors, the first processing mode when the first distance is near field; and selecting, by executing instructions with one or more processors, the second processing mode when the second distance is far field.

Example 93 includes the method of any of Examples 91 or 92, and optionally includes the first processing mode including a first set of processing operations and the second processing mode including a second set of processing operations, the second set including a greater number of processing operations than the first set.

Example 94 includes the method of any of Examples 91-93, and optionally includes the second processing mode including a dereverberation process, and the first processing mode lacking the dereverberation process.

Example 95 includes the method of any of Examples 91-94, and optionally includes the first processing mode including a dereverberation process with a first filter, and the second processing mode including the dereverberation process with a second filter, the second filter different than the first filter.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
a microphone to convert an acoustic signal to an electrical signal; and
at least one processor circuit to:
estimate a distance between a source of the acoustic signal and the microphone;
compare the distance to a threshold;
select a first processing mode as a selected processing mode when the distance is less than the threshold;
select a second processing mode as the selected processing mode when the distance is greater than the threshold;
process the electrical signal in accordance with the selected processing mode,
wherein the first processing mode includes a first set of processing operations and the second processing mode includes a second set of processing operations, the first set including a fewer number of processing operations than the second set.

2. The system of claim 1, wherein one or more of the at least one processor circuit is to estimate the distance directly from the acoustic signal.

3. The system of claim 2, wherein one or more of the at least one processor circuit is to use a neural network to estimate the distance directly from the acoustic signal.

4. The system of claim 3, wherein one or more of the at least one processor circuit is to estimate the distance as one of near-field or far-field.

5. The system of claim 4, wherein one or more of the at least one processor circuit is to:
select the first processing mode as the selected processing mode when the distance is near field; and
select the second processing mode as the selected processing mode when the distance is far field.

6. The system of claim 1, wherein the first processing mode includes a dereverberation process with a first filter, and the second processing mode includes the dereverberation process with a second filter, the second filter different than the first filter.

7. The system of claim 1, wherein one or more of the at least one processor circuit is to consume a first amount of power in the first processing mode, and one or more of the at least one processor circuit is to consume a second amount of power in the second processing mode, the second amount greater than the first amount.

8. A system comprising:
a microphone to convert an acoustic signal to an electrical signal; and
at least one processor circuit to:
estimate a distance between a source of the acoustic signal and the microphone;
compare the distance to a threshold;
select a first processing mode as a selected processing mode when the distance is less than the threshold;
select a second processing mode as the selected processing mode when the distance is greater than the threshold;
process the electrical signal in accordance with the selected processing mode,
wherein the second processing mode includes a dereverberation process, and the first processing mode lacks the dereverberation process.

9. A system comprising:
means for converting an acoustic signal to an electrical signal; and
means for processing signals, the processing means to:
estimate a distance between a source of the acoustic signal and the converting means;
compare the distance to a threshold;
select a first processing mode as a selected processing mode when the distance is less than the threshold;
select a second processing mode as the selected processing mode when the distance is greater than the threshold; and
process the electrical signal in accordance with the selected processing mode,
wherein the first processing mode includes a dereverberation process with a first filter,
and the second processing mode includes the dereverberation process with a second filter, the second filter different than the first filter.

10. The system of claim 9, wherein the first processing mode includes a first set of processing operations and the second processing mode includes a second set of processing operations, the first set including a fewer number of processing operations than the second set.

11. A system comprising:
means for converting an acoustic signal to an electrical signal; and
means for processing signals, the processing means to:
estimate a distance between a source of the acoustic signal and the converting means;
compare the distance to a threshold;
select a first processing mode as a selected processing mode when the distance is less than the threshold;
select a second processing mode as the selected processing mode when the distance is greater than the threshold; and
process the electrical signal in accordance with the selected processing mode,
wherein the processing means is to consume a first amount of power in the first processing mode, and the processing means is to consume a second amount of power in the second processing mode, the second amount greater than the first amount.

12. The system of claim 11, wherein the processing means is to estimate the distance directly from the acoustic signal.

13. The system of claim 12, wherein the processing means is to use a neural network to estimate the distance directly from the acoustic signal.

14. The system of claim 13, wherein the processing means is to estimate the distance as one of near-field or far-field.

15. The system of claim 14, wherein the processing means is to:
select the first processing mode as the selected processing mode when the distance is near field; and
select the second processing mode as the selected processing mode when the distance is far field.

16. The system of claim 11, wherein the second processing mode includes a dereverberation process, and the first processing mode lacks the dereverberation process.

* * * * *